(12) United States Patent
Dore et al.

(10) Patent No.: US 12,273,499 B2
(45) Date of Patent: Apr. 8, 2025

(54) METHODS, DEVICES AND STREAM FOR ENCODING AND DECODING THREE DEGREES OF FREEDOM AND VOLUMETRIC COMPATIBLE VIDEO STREAM

(71) Applicant: InterDigital VC Holdings, Inc., Wilmington, DE (US)

(72) Inventors: Renaud Dore, Cesson-Sevigne (FR); Julien Fleureau, Cesson-Sevigne (FR); Bertrand Chupeau, Cesson-Sevigne (FR); Gerard Briand, Cesson-Sevigne (FR); Thierry Tapie, Cesson-Sevigne (FR); Franck Thudor, Cesson-Sevigne (FR)

(73) Assignee: InterDigital VC Holdings, Inc., Wilmington, DE (US)

( * ) Notice: Subject to any disclaimer, the term of this patent is extended or adjusted under 35 U.S.C. 154(b) by 0 days.

(21) Appl. No.: 16/647,517

(22) PCT Filed: Sep. 11, 2018

(86) PCT No.: PCT/US2018/050407
§ 371 (c)(1),
(2) Date: Mar. 15, 2020

(87) PCT Pub. No.: WO2019/055389
PCT Pub. Date: Mar. 21, 2019

(65) Prior Publication Data
US 2020/0228777 A1  Jul. 16, 2020

(30) Foreign Application Priority Data

Sep. 15, 2017  (EP) .................................... 17306188
Jul. 13, 2018  (EP) .................................... 18305949

(51) Int. Cl.
*H04N 13/161* (2018.01)
*G06T 9/00* (2006.01)
(Continued)

(52) U.S. Cl.
CPC ......... *H04N 13/161* (2018.05); *H04N 13/122* (2018.05); *H04N 13/15* (2018.05); *H04N 13/178* (2018.05); *H04N 19/597* (2014.11)

(58) Field of Classification Search
CPC .... H04N 13/161; H04N 19/597; H04N 13/15; H04N 13/178; H04N 13/122; G06T 9/001; G06T 15/20
See application file for complete search history.

(56) References Cited

U.S. PATENT DOCUMENTS

| 6,157,747 A | 12/2000 | Szeliski et al. |
| 9,508,186 B2 | 11/2016 | Poelman et al. |

(Continued)

FOREIGN PATENT DOCUMENTS

| CN | 101904176 A | 12/2010 |
| CN | 103181171 A | 6/2013 |

(Continued)

OTHER PUBLICATIONS

Prakhya et al., "3DHoPD: A Fast Low Dimensional 3D Descriptor", IEEE Robotics and Automation Letters, vol. 2, No. 3, Jul. 2017, pp. 1472-1479.

(Continued)

*Primary Examiner* — Hung Q Dang
(74) *Attorney, Agent, or Firm* — Condo Roccia Koptiw LLP

(57) ABSTRACT

A sequence of three-dimension scenes is encoded as a video by an encoder and transmitted to a decoder which retrieves the sequence of 3D scenes. Points of a 3D scene visible from a determined point of view are encoded as a color image in (Continued)

a first track of the stream in order to be decodable independently from other tracks of the stream. The color image is compatible with a three degrees of freedom rendering. Depth information and depth and color of residual points of the scene are encoded in separate tracks of the stream and are decoded only in case the decoder is configured to decode the scene for a volumetric rendering.

17 Claims, 9 Drawing Sheets

(51) Int. Cl.
*G06T 15/20* (2011.01)
*H04N 13/122* (2018.01)
*H04N 13/15* (2018.01)
*H04N 13/178* (2018.01)
*H04N 19/597* (2014.01)

(56) References Cited

U.S. PATENT DOCUMENTS

| | | | |
|---|---|---|---|
| 10,313,686 B2* | 6/2019 | Abbas | H04N 19/597 |
| 2003/0112237 A1 | 6/2003 | Corbetta | |
| 2005/0128196 A1* | 6/2005 | Popescu | G01S 17/48 345/420 |
| 2005/0180623 A1* | 8/2005 | Mueller | G01B 11/00 382/154 |
| 2006/0284880 A1 | 12/2006 | Zhou et al. | |
| 2010/0309287 A1 | 12/2010 | Rodriguez | |
| 2010/0310155 A1 | 12/2010 | Newton et al. | |
| 2011/0074924 A1* | 3/2011 | Barenbrug | G06T 7/593 348/43 |
| 2013/0222377 A1* | 8/2013 | Bruls | H04N 19/597 345/419 |
| 2013/0222534 A1 | 8/2013 | Rusanovskyy et al. | |
| 2013/0235152 A1 | 9/2013 | Hannuksela et al. | |
| 2013/0321576 A1 | 12/2013 | Macq et al. | |
| 2015/0063681 A1 | 3/2015 | Bhardwaj et al. | |
| 2015/0071516 A1 | 3/2015 | Kim | |
| 2015/0078456 A1* | 3/2015 | Hannuksela | H04N 19/42 375/240.25 |
| 2015/0261184 A1* | 9/2015 | Mannion | H04N 13/275 348/41 |
| 2015/0341614 A1 | 11/2015 | Senoh et al. | |
| 2016/0088281 A1 | 3/2016 | Newton et al. | |
| 2016/0104314 A1 | 4/2016 | Nakazato et al. | |
| 2016/0112713 A1 | 4/2016 | Russell | |
| 2016/0165209 A1 | 6/2016 | Huang et al. | |
| 2017/0061701 A1* | 3/2017 | Mittal | G06T 5/002 |
| 2017/0272729 A1* | 9/2017 | Kass | H04N 13/344 |
| 2017/0310945 A1* | 10/2017 | Juang | H04N 13/144 |
| 2017/0318301 A1* | 11/2017 | Li | H04N 19/126 |
| 2018/0205925 A1* | 7/2018 | Doh | G06T 7/74 |
| 2018/0240280 A1 | 8/2018 | Chen et al. | |
| 2018/0278916 A1* | 9/2018 | Kim | G03B 37/04 |
| 2018/0350134 A1* | 12/2018 | Lodato | G06T 15/20 |
| 2019/0297342 A1* | 9/2019 | Ma | H04N 19/513 |
| 2020/0084428 A1 | 3/2020 | Oh et al. | |

FOREIGN PATENT DOCUMENTS

| | | |
|---|---|---|
| CN | 104904205 A | 9/2015 |
| CN | 105165008 A | 12/2015 |
| CN | 105519120 A | 4/2016 |
| CN | 105898274 A | 8/2016 |
| KR | 10-2015-0029353 A | 3/2015 |
| KR | 10-2016-0045911 A | 4/2016 |
| KR | 20180069786 A | 6/2018 |
| WO | WO 2008054100 A1 | 5/2008 |
| WO | WO 2016207669 A2 | 12/2016 |
| WO | 2017/142353 A1 | 8/2017 |

OTHER PUBLICATIONS

Zhao et al., "Three-Dimensional Object Reconstruction Using Patch Significance Correspondence", Journal of Electronic Imaging, vol. 26, No. 2, Mar./Apr. 2017, pp. 023017-1 to 023017-13.
CN 105165008 A, 15, US 2016/0088281 A1, Cite No. 14.
CN 101904176 A, 16, US 2010/310155 A1, Cite No. 1 in "US Patent Application Publications" section of the Information Disclosure Statement filed in the subject application on Mar. 15, 2020.
CN 103181171 A, 17, US 2013/222377 A1, in Non-Final Office Action issued in the subject application on Jan. 25, 2021 as Cite No. B.
CN 104904205 A, 18, US 2015/341614 A1, Cite No. 2 in "US Patent Application Publications" section of the Information Disclosure Statement filed in the subject application on Mar. 15, 2020.
KR 20180069786 A, 26, US 20180240280 A1, 25.

* cited by examiner

METHODS, DEVICES AND STREAM FOR ENCODING AND DECODING THREE DEGREES OF FREEDOM AND VOLUMETRIC COMPATIBLE VIDEO STREAM

CROSS REFERENCE TO RELATED APPLICATIONS

This application is the national stage entry under 35 U.S.C. § 371 of International Application PCT/US2018/050407, filed Sep. 11, 2018, which was published in accordance with PCT Article 21(2) on Mar. 21, 2019, in English, and which claims the benefit of European Patent Application No. 17306188.8 filed Sep. 15, 2017, and European Patent Application No. 18305949.2 filed Jul. 13, 2018.

1. TECHNICAL FIELD

The present disclosure relates to the domain of volumetric video content. The present disclosure is also understood in the context of the formatting of the data representative of the volumetric content, for example for an immersive rendering on end-user devices such as mobile devices or Head-Mounted Displays.

2. BACKGROUND

This section is intended to introduce the reader to various aspects of art, which may be related to various aspects of the present disclosure that are described and/or claimed below. This discussion is believed to be helpful in providing the reader with background information to facilitate a better understanding of the various aspects of the present invention. Accordingly, it should be understood that these statements are to be read in this light, and not as admissions of prior art.

Immersive video, also called 360° flat video, allows the user to watch all around himself through rotations of his head around a still point of view. Rotations only allow a 3 Degrees of Freedom (3DoF) experience. Even if 3DoF video is sufficient for a first omnidirectional video experience, for example using a Head-Mounted Display device (HMD), 3DoF video may quickly become frustrating for the viewer who would expect more freedom, for example by experiencing parallax. In addition, 3DoF may also induce dizziness because of a user never only rotates his head but also translates his head in three directions, translations which are not reproduced in 3DoF video experiences.

Volumetric video (also known as 6 Degrees of Freedom (6DoF) video) is an alternative to 3DoF video. When watching a 6DoF video, in addition to rotations, the user can also translate his head, and even his body, within the watched content and experience parallax and even volumes. Such videos considerably increase the feeling of immersion and the perception of the scene depth and also prevent from dizziness by providing consistent visual feedback during head translations. The content is created by the means of dedicated sensors allowing the simultaneous recording of color and depth of the scene of interest. The use of rig of color cameras combined with photogrammetry techniques is a common way to perform such a recording.

While 3DoF videos comprise a sequence of images resulting from the un-mapping of texture images (e.g. spherical images encoded according to latitude/longitude projection mapping or equirectangular projection mapping). 6DoF video frames embed information from several points of views. 6DoF video frames, also called Multiview+Depth (MVD) frames, comprise a plurality of images captured from different points and/or direction of view. They also can be viewed as a temporal series of point clouds resulting from a three-dimension capture. Two kinds of volumetric videos may be considered depending on the viewing conditions. A first one (i.e. complete 6DoF) allows a complete free navigation within the video content whereas a second one (aka. 3DoF+) restricts the user viewing space to a limited volume, allowing limited translation of the head and parallax experience. This second context is a valuable trade-off between free navigation and passive viewing conditions of a seated audience member. In addition. 3DoF+ videos require less cameras and simpler rigs to be acquired than 6DoF videos.

3DoF videos may be encoded in a stream as a sequence of rectangular color images generated according to a chosen projection mapping (e.g. cubical projection mapping, pyramidal projection mapping or equirectangular projection mapping). This encoding has the advantage to make use of standard image and video processing standards. Views of a 3DoF+ video (color image+depth image) may be encoded by legacy standard encoding methods. However, encoding a n views video is equivalent to encode 2n videos and require a huge amount of data, making the resulting stream unsuitable to broadcasting or streaming. 3DoF+ and 6Dof videos require additional data to encode the depth of colored points of point clouds. The kind of rendering (i.e. 3DoF or volumetric rendering) for a volumetric scene is not known a priori when encoding the scene in a stream. Up to date, streams are encoded for one kind of rendering or the other. There is a lack of a stream format, and associated methods and devices, that can carry data representative of a volumetric scene that can be encoded at once and decoded either as a 3DoF video or as a volumetric video (3DoF+ or 6DoF) and that require a smaller amount of data than the MVD standard encoding.

3. SUMMARY

References in the specification to "one embodiment", "an embodiment", "an example embodiment", "a particular embodiment" indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

According to one or more embodiments, there is provided a device and a method for encoding a 3D scene obtained by different means into a stream. The stream is structured in elements of syntax. The method comprises:
  generating first color data by projecting points of the 3D scene visible from a point of view onto a first color map according to a first projection mapping. The first color data is a color image adapted to a rendering enabling 3 degrees of freedom of rotation around the point of view.
  generating first depth data by projecting points of the 3D scene visible from the point of view onto a first depth map according to a second projection mapping. The first depth data is encoded as patch pictures packed in a depth patch atlas associated with a patch data item list. A patch data item comprises information that maps a depth patch picture with a pixel area in the color image;

generating second color data and second depth data representative of points of the 3D scene not visible from said point of view; and encoding, in the stream, the first color data in a first element of syntax and the first depth data, the second color data and the second depth data in at least a second element of syntax.

The present disclosure also relates to a device and a method for decoding a 3D scene from a stream generating according to the method and/or by a device as presented upper.

4. LIST OF FIGURES

The present disclosure will be better understood, and other specific features and advantages will emerge upon reading the following description, the description making reference to the annexed drawings wherein.

5. DETAILED DESCRIPTION OF EMBODIMENTS

Figure 1:
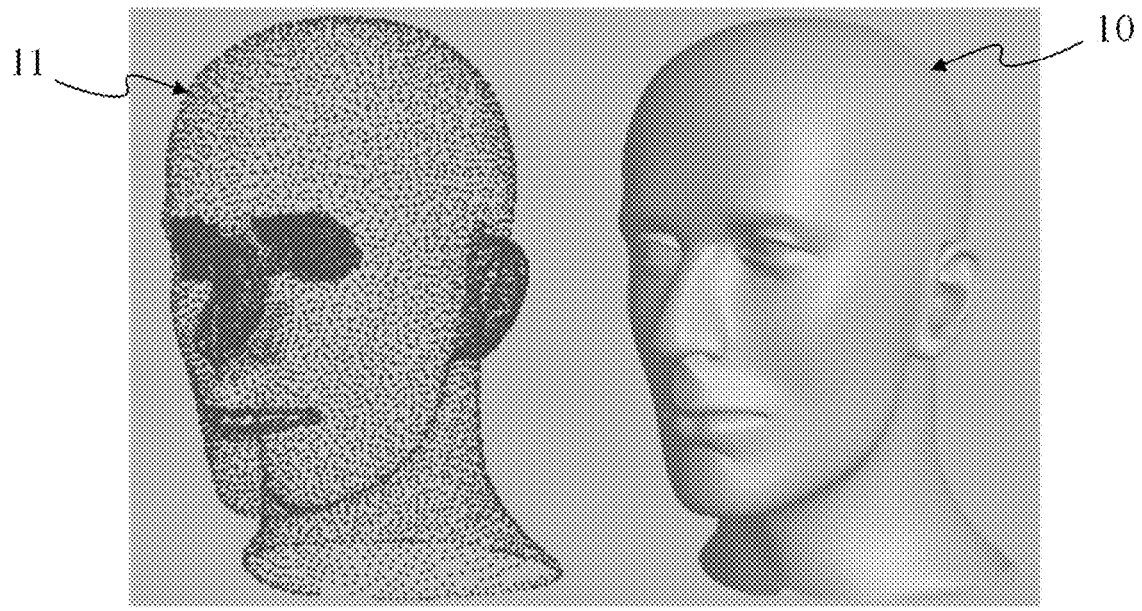
FIG. 1 shows a three-dimension (3D) model of an object and a points of a point cloud corresponding to the 3D model, according to a non-restrictive embodiment of the present principles.

The subject matter is now described with reference to the drawings, wherein like reference numerals are used to refer to like elements throughout. In the following description, for purposes of explanation, numerous specific details are set forth in order to provide a thorough understanding of the subject matter. It can be evident, however, that subject matter embodiments can be practiced without these specific details.

The present description illustrates the principles of the present disclosure. It will thus be appreciated that those skilled in the art will be able to devise various arrangements that, although not explicitly described or shown herein, embody the principles of the disclosure.

The present principles will be described in reference to particular embodiments of a method of encoding a data representative of a three-dimension (3D) scene in a stream for a 3DoF and/or a volumetric rendering of the 3D scene, a format for a stream carrying such data, and a method for decoding such data from such a stream in case the decoder is configured to provide decoded data to a 3DoF renderer and/or to a volumetric (i.e. 3DoF+ or 6DoF) scenes. A volumetric video is a sequence of volumetric scenes that may be captured as a sequence of MVD frames by a plurality of cameras. A MVD frame comprises a color and a depth image. The stream carries data that a 3DoF renderer can use as delivered. A 3DoF renderer does not need any update of modification to render the volumetric scene as captured from a fixed point of view. A first element of syntax of the stream comprises data corresponding to the part of the scene that a 3DoF renderer is expecting to render the 3D scene from a fixed point of view. To have the 3D scene rendered by a volumetric renderer in which the point of view is not fixed, the stream comprises at least a second element of syntax. In a first embodiment, the second element of syntax comprises the MVD frames from which pixels corresponding to points encoded in the first element of syntax is removed. In a second embodiment, the second element of syntax comprises additional information about the part of the 3D scene that is not visible from a first point of view.

According to the present principles, starting from a 3D scene, a coding method implemented in a coder is used to generate a data stream carrying data representative of the 3D scene. The encoding method prepares a color image that carries data for a 3DoF rendering of the 3D scene from a point of view. This first color image is embedded in a first element of syntax of the generated stream in order to be extractable from the stream independently from other data. In preparation to a volumetric rendering, the method encodes the depth of the points projected in the first color image. The depth of these points (the points visible from a determined point of view) may be encoded as a depth image, in a variant, in order to optimize the dynamics of the value range used to encode depth, the depth may be encoded as a patch atlas according to existing methods. In the first embodiment, the method removes pixels (i.e. replace them by a default color and depth, e.g. black) of the color and the depth images of the MVD frame corresponding to points of the scene that have been used for generating the first color image. Residual points of the scene are points that are not visible from the point of view determined to be the fixed point of view in case of a 3DoF rendering. Pixels corresponding to the residual points are left in the MVD frames. In the second embodiment, the method further encodes the color and the depth of points of the scene that are not already encoded in the first color image. Residual points of the scene are points that are not visible from the point of view determined to be the fixed point of view in case of a 3DoF rendering. Residual points may be encoded in one or more color image and depth image. In a variant, residual points are encoded in patch atlas images according to existing methods. Data prepared in view of a volumetric rendering are embedded in a second element of syntax of the stream.

According to the present principles, a decoding method implemented in a decoder is disclosed. The decoder obtains a stream encoded according the present encoding method from a source, for example a memory or a network interface. The stream comprises at least two elements of syntax, a first element of syntax carrying data representative of a 3D scene for a 3DoF rendering. In an embodiment, this first element of syntax comprises a color image encoded according to a projection mapping of points of the 3D scene to the color image from a determined point of view. The at least one second element of syntax of the stream carries data required by a volumetric renderer to render the 3D scene in 3DoF+ or 6DoF mode. The decoder decodes the first color image from the first element of syntax of the stream. In case the decoder is configured to decode the stream for a 3DoF rendering, the decoder provides a further circuit, for example to a renderer or to a format converter with the decoded data from the first element of syntax of the stream. In case the decoder is configured to decode the stream in a volumetric mode (i.e. 3DoF+ or 6DoF), the decoder decodes data embedded in the at least one second element of syntax and provide a further module, for example a renderer or a format converter, with every decoded data.

Figure 15:
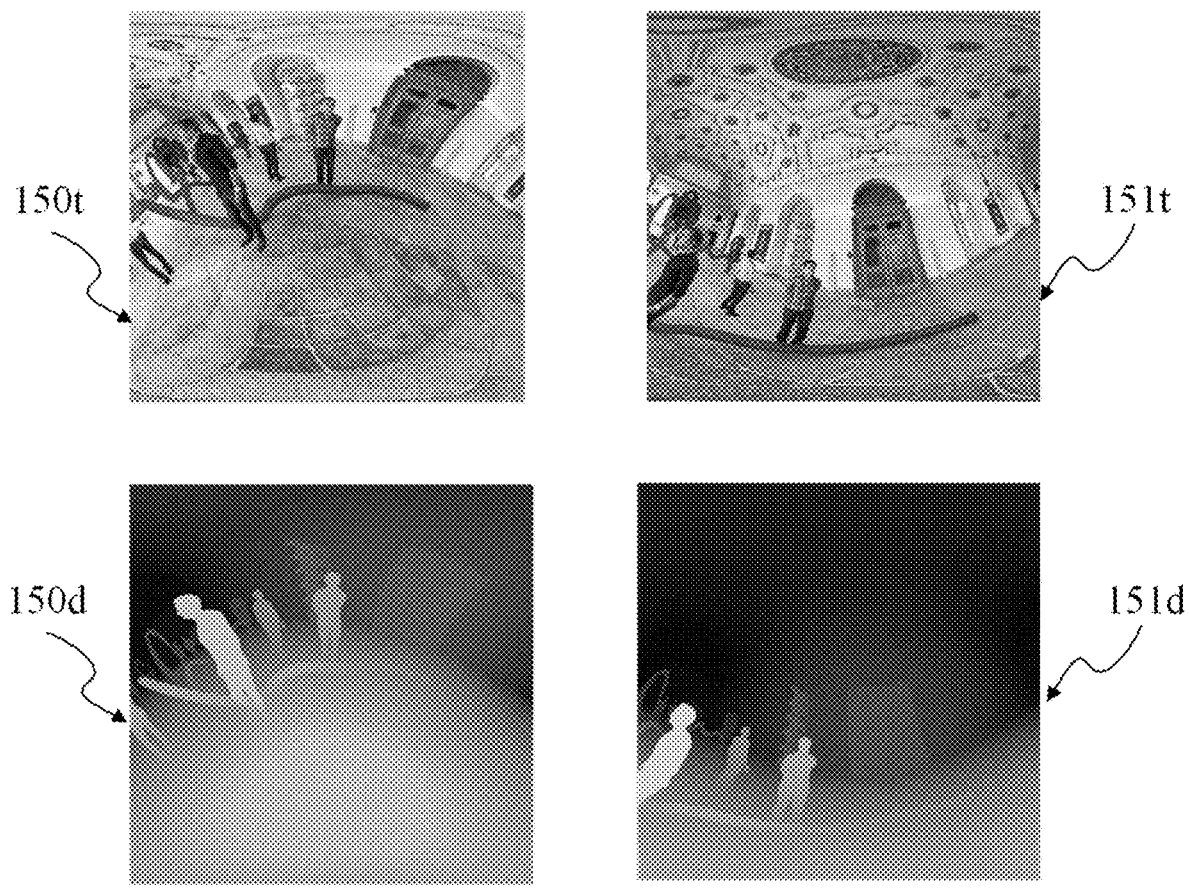
FIG. 15 shows a multi-view plus depth (MVD) frame comprising, two views, according to a turn-restrictive embodiment of the present principles.

FIG. 15 shows a multi-view plus depth (MVD) frame comprising two views. Each view of a MVD frame comprises a color image (also called texture) and a depth image. In the example of FIG. 15, the MVD frame comprises two views, the first view comprising a color image 150*t* and a depth image 150*d* and the second view comprising a color image 151*t* and a depth image 151*d*. In a variant, a view comprises only one image in pixels of which color and depth are encoded together. The first and second views corresponds to part of the scene captured by two cameras (wide angle cameras in the example of FIG. 15) oriented in different directions and located at different positions. Some objects are present on both images (e.g. characters, doors, part of the ceiling, etc. . . . ). Encoding these two views using legacy standard compression method leads to encode several times the same information and, so, to generate a very large stream.

Each view of a MVD frame is associated with the extrinsic and intrinsic parameters of the camera which captured it in the form of metadata. By using the extrinsic parameters (e.g. location and position of the camera in the 3D scene) of the camera and the depth image, it is possible to de-project pixels of the color image into the 3D space to obtain a color point cloud.

FIG. 1 shows a three-dimension (3D) model of an object 10 and a points of a point cloud 11 corresponding to 3D model 10. Model 10 may be a 3D mesh representation and points of point cloud 11 may be the vertices of the mesh. Points 11 may also points spread on the surface of faces of the mesh. Model 10 may also be represented as a splatted version of point of cloud 11; the surface of model 10 being created by splatting the point of point of cloud 11. Model 10 may be represented by a lot of different representations such as voxels or splines. FIG. 1 illustrates the fact that it is always possible to define a point cloud from a surface representation of a 3D object and reciprocally always possible to create a surface representation of a 3D object from a point of cloud. As used herein, projecting points of a 3D object (by extension points of a 3D scene) to an image is equivalent to projecting any representation of this 3D object to an object.

Figure 2:
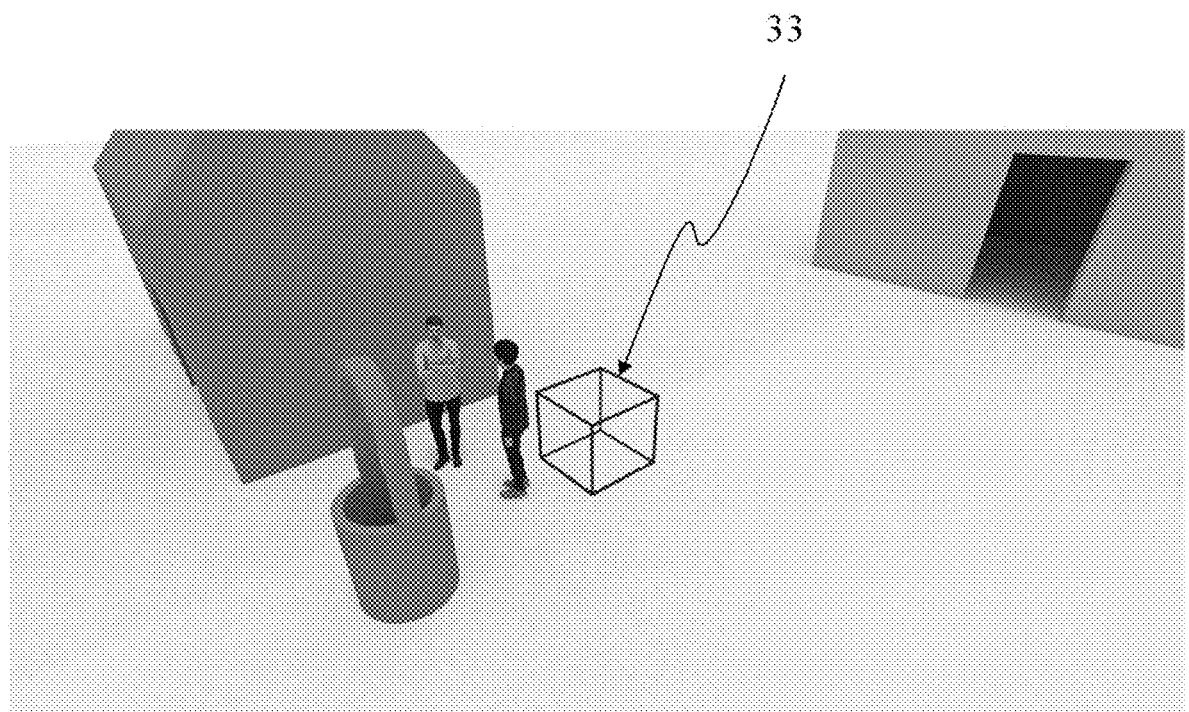
FIG. 2 shows an image representing a three-dimension scene comprising a surface representation of several objects, according to a non-restrictive embodiment of the present principles.

FIG. 2 shows an image 20 representing a three-dimension scene comprising a surface representation of several objects. The scene may have been captured using any suitable technology. For example, it may have been created using computer graphics interface (CGI) tools. It may have been captured by color image and depth image acquisition devices as a MVD frame. In such a case, it is possible that part of the objects that are not visible from the acquisition devices (e.g. cameras) may not be represented in the scene as described in relation to FIGS. 3 and 8. The example scene illustrated in FIG. 2 comprises houses, two characters and a well. Cube 33 on FIG. 2 illustrates a space of view from which a user is likely to observe the 3D scene from.

Figure 3:
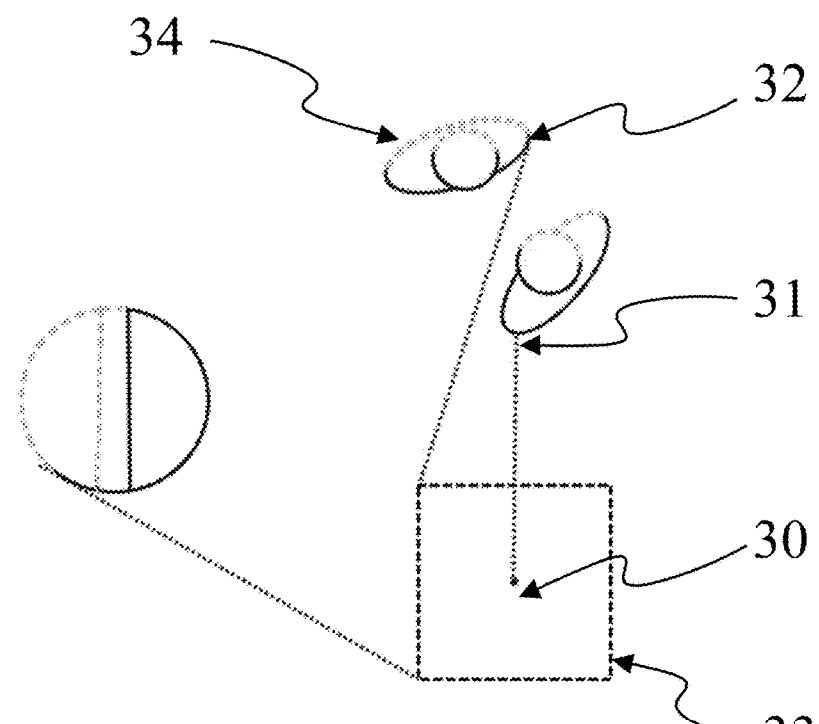
FIG. 3 illustrates an example arrangement of points of view on tire scene of FIG. 2 and visible points of this scene from different points of view of this arrangement, according to a non-restrictive embodiment of the present principles.

FIG. 3 illustrates an example arrangement of points of view on a scene and visible points of this scene from different points of view of this arrangement. To be rendered and displayed by an immersive rendering device (e.g. a cave or a Head Mounted Display device (HMD)), a 3D scene is considered from a point of view, for example view point 30. Point 31 of the scene, corresponding to the right elbow of the first character is visible from point of view 30 as no opaque object lays between point of view 30 and scene point 31. On the contrary, scene point 32, corresponding to the left elbow of the second character, is not visible from point of view 30 as it is occulted by points of the first character. For 3DoF rendering, only a point of view, for example point of view 30 is considered. The user may rotate his head in three degrees of freedom around the point of view but cannot move the point of view. Points of the scene to encode in the stream are points visible from this point of view. There is no need to encode points of the scene that are not visible from this point of view as the user cannot access to them by moving the point of view. In 6DoF rendering the user may move the point of view everywhere in the scene. In this case, it is valuable to encode every point of the scene in the content stream as every point is potentially accessible by a user who can displace his point of view. At the encoding stage, there is no means to know, a priori, from what point of view the user will observe the scene. In 3DoF+ rendering, the user may move the point of view within a limited space around a point of view. For example, the user may move his point of view within a cube 33 centered on point of view 30 and, so experience parallax as illustrated in relation to FIG. 4. Data representative of the part of the scene visible from any point of the space of view, for example the cube 33, are to be encoded into the stream. The size and shape of the space of view may be decided and determined at the encoding step and encoded in the stream. The decoder obtains this information from the stream and the renderer limits the space of view to the space determined by the obtained information. In another embodiment, the renderer determines the space of view according to hardware constraints, for example in relation to capabilities of the sensors that detects the movements of the user. In such a case, if, at the encoding phase, a point visible from a point within the space of view of the renderer has not been encoded in the data stream, this point will not be rendered. In an embodiment, the encoding method encodes every point of the scene in the stream without considering the rendering space of view. In another embodiment, in order to optimize the size of the stream, only a subset of the points of the scene, for instance determined according to a rendering space of view, is encoded.

Figure 4:
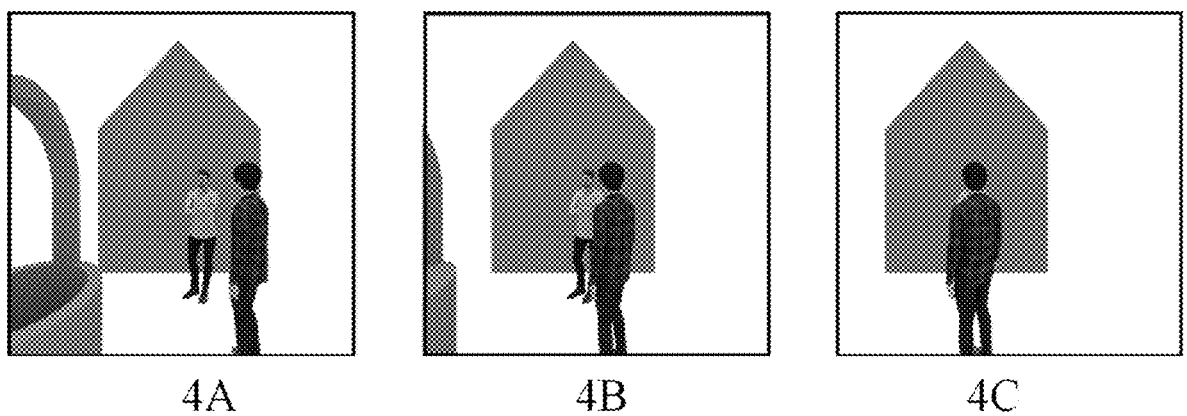
FIG. 4 illustrates the parallax experience by showing different views of the scene of FIG. 2 according to the point of view of the FIG. 3, according to a non-restrictive embodiment of the present principles.

FIG. 4 illustrates the parallax experience that is allowed by volumetric rendering, FIG. 4B illustrates the part of the scene a user could see from point of view 30 of the FIG. 3. From this point of view, the two characters are in a given spatial configuration, for example, the left elbow of the second character (with a white shirt) is hidden by the body of the first character while his head is visible. When the user is rotating his head in the three degrees of freedom around point of view 30, this configuration does not change. If the point of view is fixed, the left elbow of the second character is not visible. FIG. 4A illustrates the same seen from a point of view at the left of the space of view 33 of FIG. 3. From such a point of view, point 32 of FIG. 3 is visible due to the parallax effect. So, for a volumetric rendering, point 32 has to be encoded in the data stream or will not be rendered. FIG. 4C illustrates the same scene observed from a point of view at the right of the space of view 33 of FIG. 3. From this position of the point of view, the second character is almost entirely hidden by the first character. By moving the point of view within the 3D scene, the user experiences the parallax effect. Two parallax effects may be distinguished: an inter-objects parallax (like parallax between characters) and an intra-object parallax (like discovering a part of the face of the front character).

Figure 5:
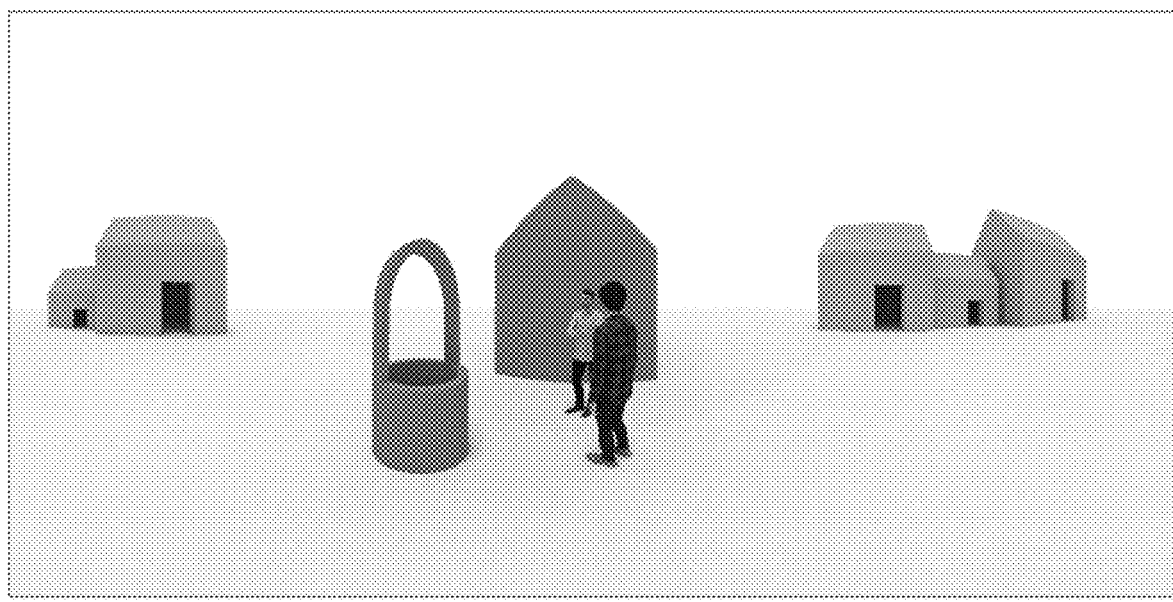
FIG. 5 shows a color image encoding the points of the scene of FIG. 2 visible from the point of view of FIG. 3 according to an equirectangular projection mapping, according to a non-restrictive embodiment of the present principles.
Figure 6:
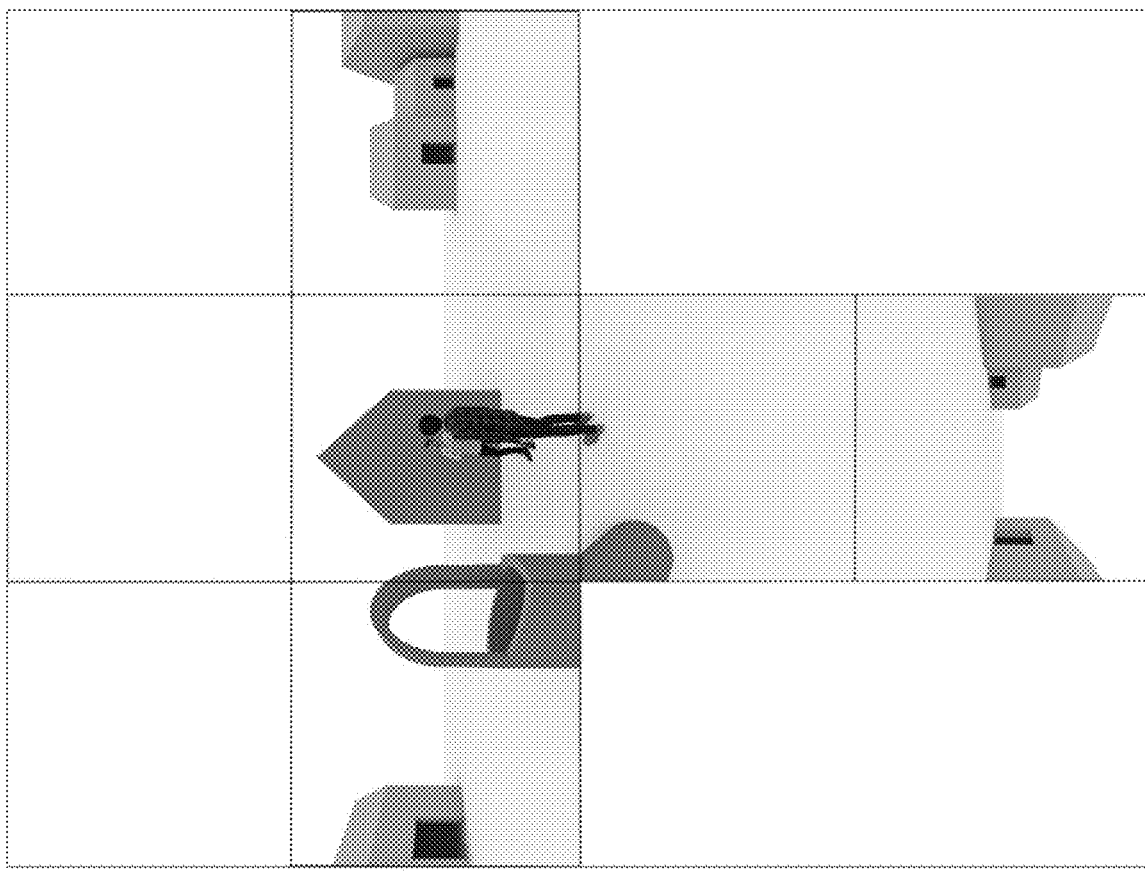
FIG. 6 shows an image of the same points of the scene then FIG. 5 encoded according to a cubical projection mapping, according to a non-restrictive embodiment of the present principles.

FIG. 5 shows a color image encoding the points of the scene of FIG. 2 visible from point of view 30 of FIG. 3 according to an equirectangular projection mapping. Equirectangular projection mapping is an example of spherical projection mapping. FIG. 6 shows an image of the same points of the scene encoded according to a cubical projection mapping. There are different cubical projection mappings. For example, faces of the cube may be arranged differently in image of FIG. 6 and/or faces may be differently oriented. The projection mapping to encode points of the scene visible from the determined point of view is selected, for example, according to compression criteria, or, for instance according to a standard option. It is known by a person skilled in the art that it is always possible to convert an image obtained by the projection of a point cloud according to a projection mapping to an equivalent image of the same point cloud according to a different projection mapping. Such a conversion may nevertheless imply some loss in the resolution of the projection.

FIGS. 5 and 6 are in black and white in the present application. It is though understood that they are examples of color images, encoding the color of the points of the scene, for example in RGB or in YUV. FIGS. 5 and 6 comprise data necessary for a 3DoF rendering of the 3D scene. A decoder receiving a data stream comprising, in a first element of syntax, an image as the example images of FIGS. 5 and 6 decodes the image using a method correlated to the method used for the encoding of the image. The stream may be encoded according to standard image and video compression methods and standard format for image and video transport, for example MPEG 2, H264 or H265. The decoder may transmit the decoded image (or sequence of images) to a 3DoF renderer or to a module for reformatting for example. A 3DoF renderer would project the image on a surface corresponding to the projection mapping used at the encoding (e.g. a sphere for the image of FIG. 5, a cube for the image of FIG. 6). In a variant, the renderer converts the image according to a different projection mapping before projecting it.

An image is compatible with a 3DoF rendering when the image encodes points of a 3D scene according to a projection mapping. The scene may comprise points at 360°. Projection mappings commonly used to encode images compatible with 3DoF rendering are, for instance, among spherical mappings: equirectangular projection or longitude/latitude projection, or different layouts of cubical projection mappings or pyramidal projection mappings.

Figure 7:
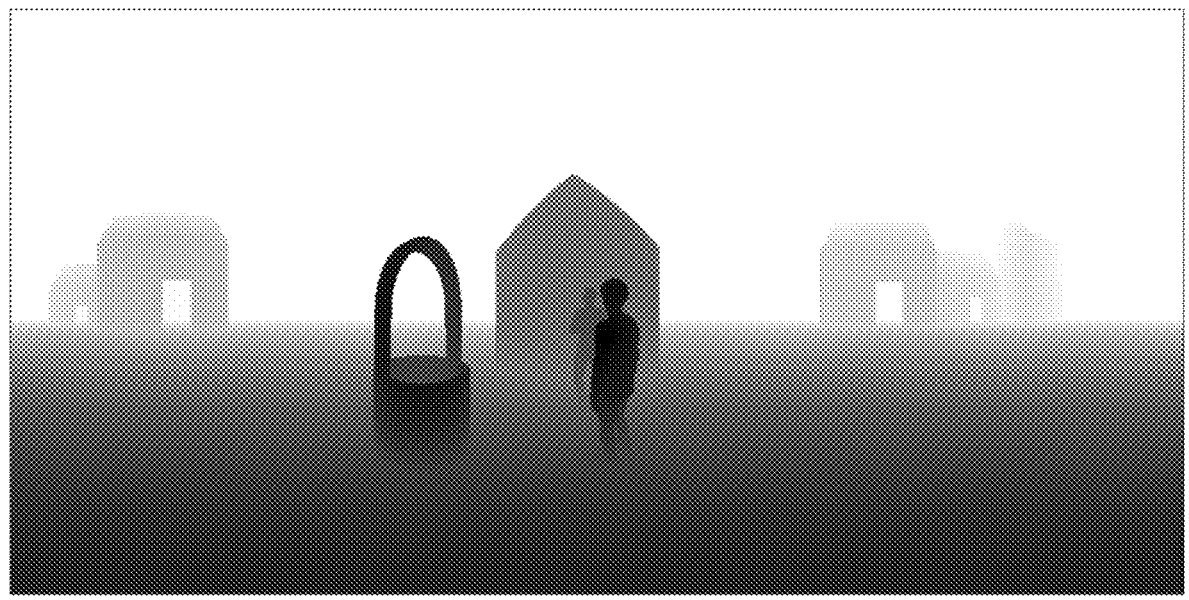
FIG. 7 shows a depth map (also called depth image) of the 3D scene of FIG. 2 from the point of view of FIG. 3, according to a son-restrictive embodiment of the present principles.

FIG. 7 shows a depth map (also called depth image) of the 3D scene of FIG. 2 from point of view 30 of FIG. 3. Depth information are required for a volumetric rendering. In the example encoding of the image of FIG. 7, the darker the pixel, the closer the point projected to this pixel from the point of view. For example, the depth may be encoded on twelve bits, that is the depth is represented by an integer between 0 and $2^{12}-1=4095$. If, for instance, the closest point is located at 1 meter from the determined point of view and the farthest point at 25 meters, a linear encoding of depth would be performed by steps of 0.586 centimetres (=(2500−100)/4096). Depth may also be encoded according to a logarithmic scale as a depth value imprecision of a point far from the point of view is less important than a depth value imprecision for a point close to the point of view. In the example embodiment of FIG. 7, depth of points of the scene visible from the point of view is encoded in a depth map according to the same projection mapping than the projection mapping used to encode the color map of FIG. 5. In another embodiment, depth may be encoding according to a different projection mapping. The renderer converts the depth map and/or the color image in order to de-project points of the scene encoded in these data. This embodiment may increase the depth imprecision.

Figure 8:
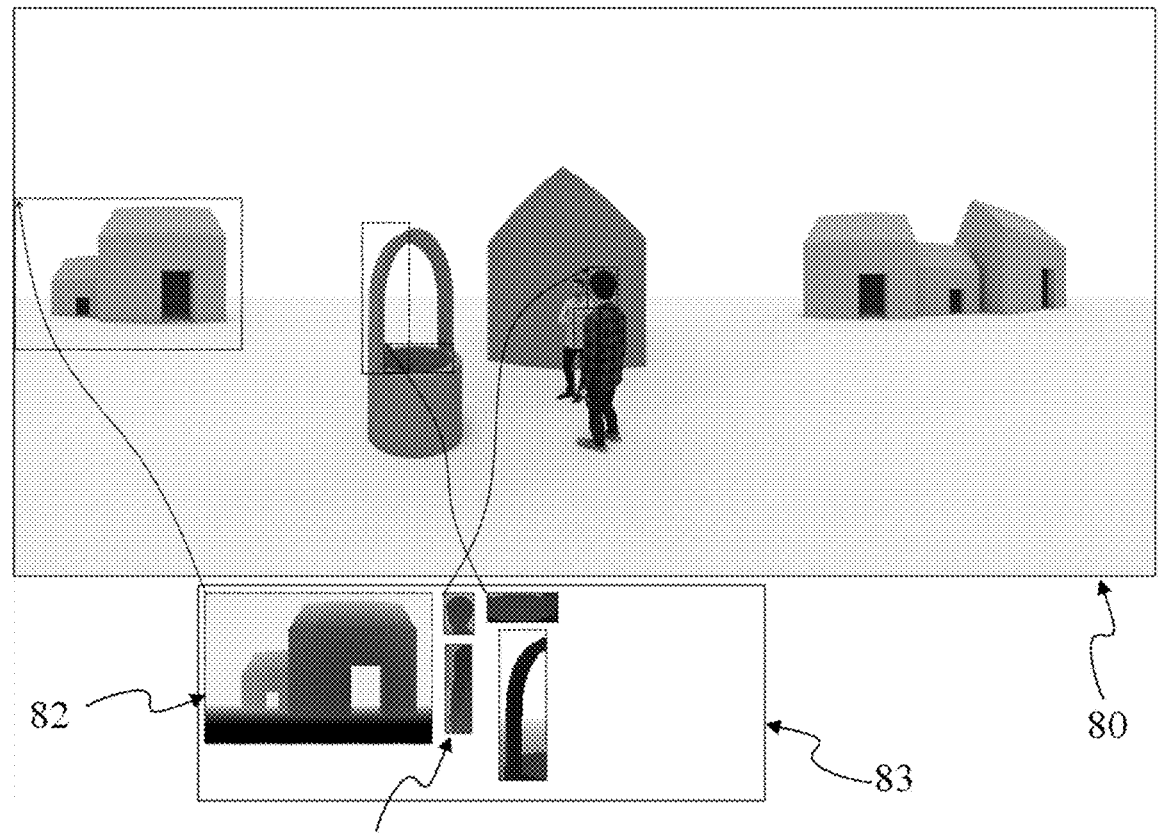
FIG. 8 illustrates a part of a depth patch atlas for points of the scene projected to the color map of FIG. 5, according to a non-restrictive embodiment of the present principles.

In another embodiment, depth of points visible from the determined point of view, for example point of view 30 of FIG. 3, may be encoded as a patch atlas. FIG. 8 illustrates a part of a depth patch atlas 83 for points of the scene projected to the color map 80 of FIG. 5. A patch is a picture obtained by clustering the projected points. A patch corresponds to a part of the projected points which define an area of adjacent pixels in the projection map and which are depth consistent. The part is defined by the angular range the corresponding projected points occupy in the space from the point of view. Patches are clustered in the projection map according to their connectivity and depth. An area P covers a set of adjacent pixels of the projection map where a projection occurred and which is depth-consistent. The depth consistency check comes down to considering the distance Z between the point of view and each projected point covered by P, and ensuring that the distance range of these pixels is not deeper than a threshold T. This threshold may depend on Zmax (the maximum distance between the viewing point and the projected pixels covered by P), on the dynamic D of the depth stored in the generated picture by the further generating operation, and on perceptual properties. For example, the typical human visual acuity is about three minutes of arc. Determining the threshold T according to these criteria have several advantages. At one hand, an image patch in the picture generated in the further generating operation will cover a depth range consistent with the depth resolution of pixels of the generated picture (e.g. 10 bits or 12 bits) and, so, be robust to compression artifacts. On the other hand, the depth range is perceptually-driven by the 3DoF+ context. Indeed, human vision does not equally perceive distance for close or far points. As an example, the threshold may be defined according to equation [eq. 1].

$$T(Z_{max}, D, VA) = Z_{max} \frac{Z^D \tan\left(\frac{VA}{2}\right)}{1 + 2^D \tan\left(\frac{VA}{2}\right)} \quad [\text{eq. 1}]$$

Where VA is a value for visual acuity.

For example, patch 81 is obtained for the left arm of the first character. Encoding the depth of the part of the projected points of the scene is valuable as the $2^D$ values of the dynamics range are used to encode a short distance of a couple of decimetres, allowing a higher precision for the depth encoding and a higher robustness to compression artifacts. A patch 82 is obtained for a pair of houses. The depth range to encode is bigger but, as the houses are far from the point of view, an imprecision in the encoding is leading to less visible visual artifacts. Though, depth encoding precision is increased for this part of the scene compared to the depth map of FIG. 7.

Patches are arranged in a picture 83, called patch atlas 83, with a given angular resolution (e.g. 3 seconds per pixel or 5 seconds per pixel) according to the size that the projection of points of the patch will occupy in the patch atlas. The arrangement consists in reserving an area in the patch atlas for projecting (depth and color) the points associated with the patch. The size of the reserved area depends on the picture angular resolution and on the angular range of the patch. The location of the areas in the frame is optimized to cover the picture's frame without overlapping. A patch data item comprises data mapping a depth patch packed in the depth patch atlas with corresponding color pixel area in the color image. For example, a patch data item comprises coordinates of the up left corner of the patch in the patch atlas, the width and height of the patch in the patch atlas, the up left corner of the corresponding color pixels in the color image, the width and height of the area of the color image of the corresponding color pixels. In a variant, information of a patch data item is represented by angular range data to facilitate the localisation in a color image encoded, for example, according to a spherical projection mapping.

Figure 9:
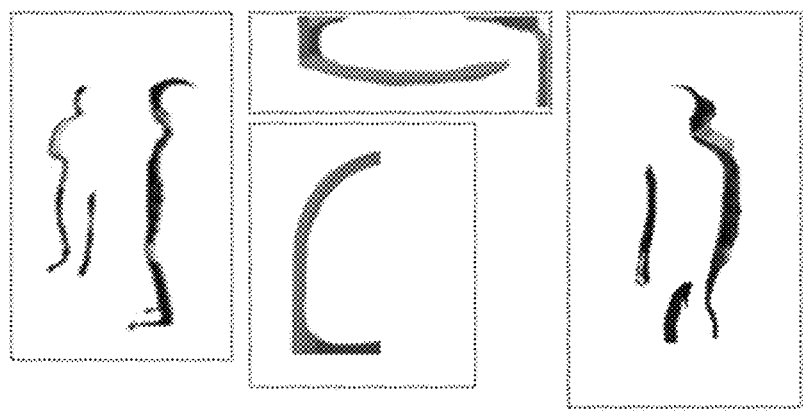
FIG. 9 shows an encoding of residual points as patches after the encoding of the image of FIG. 5 or FIG. 6, according to a non-restrictive embodiment of the present principles.

Points visible from the determined point of view are a part of the points of the 3D scene. To fully encode the 3D scene, residual points (i.e. the point that have not been encoded in the 3DoF compatible color image and corresponding depth data) are encoded in the stream. FIG. 9 shows an encoding of residual points as patches.

Figure 16:
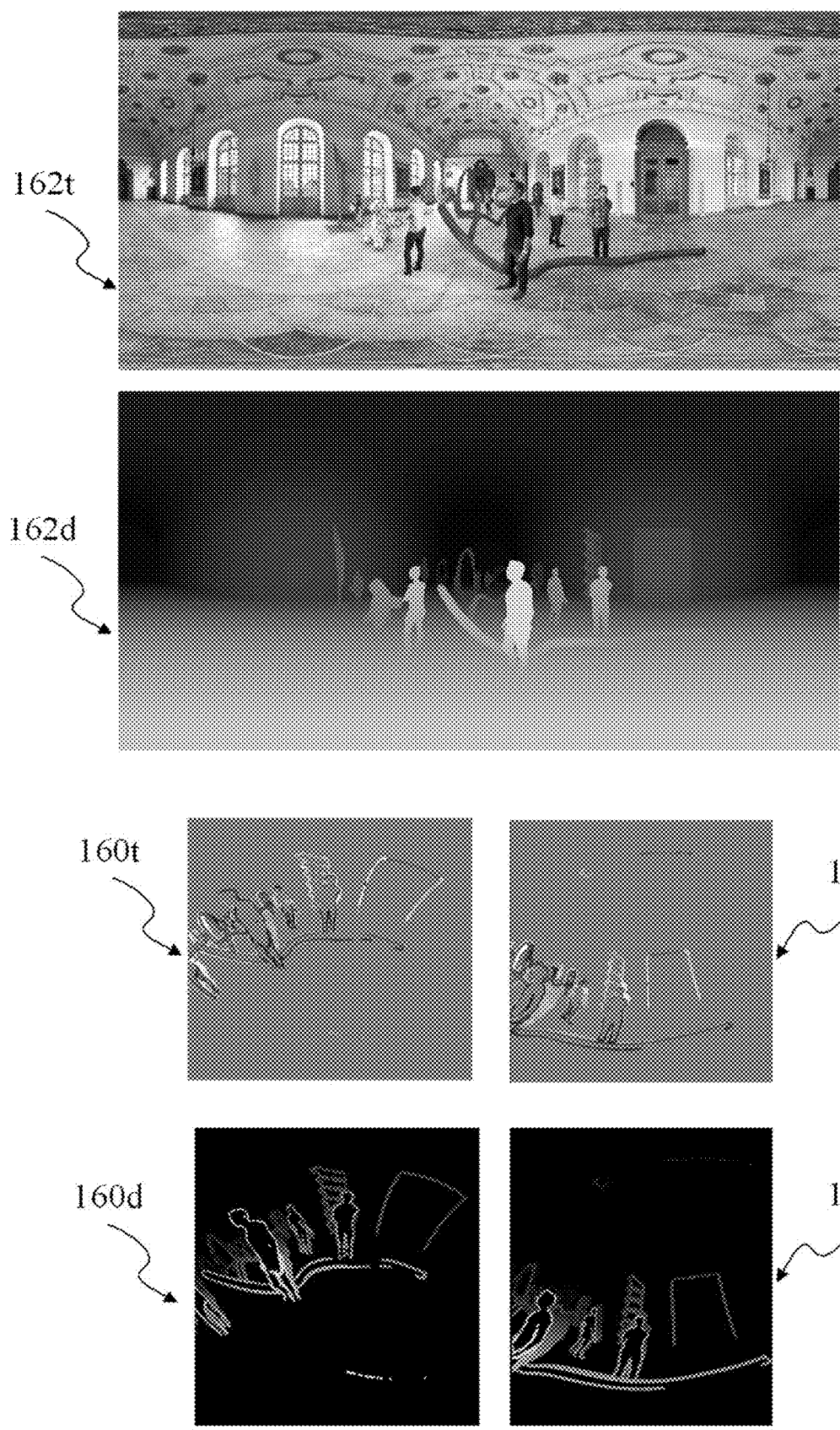
FIG. 16 shows, starting from the MVD frame of FIG. 15, the generation of an immersive image from a point of view and fine removing of not used pixels from views of the frame, according to a non-restrictive embodiment of the present principles.

FIG. 16 shows, starting from the MVD frame of FIG. 15, the generation of an immersive image from a point of view and the removing of used pixels from views of the frame. As illustrated in relation to FIGS. 1, 3, 5 and 7, the data of the MVD frame are used to instantiate a 3D scene, for example as a point cloud. Any 3D point of the point cloud is associated with pixels of the views from which it has been generated from. A 3D point is associated with at least one pixel and may also be associated with several pixels, each pixel belonging to a different view. A point of view is obtained and points of the 3D scene visible from this point of view are projected onto a first view 162t and 162d (i.e. a color image and a depth image). According to the first embodiment of the present principles, when a 3D point is projected onto the first view, pixels associated with this 3D points are removed from their views. For color images, removing a pixel is performed, for example, by replacing the color value by a default color value, for example black, white or grey. For depth images, the depth value stored in the pixel is replaced by a default value indicating that this pixel (and the corresponding pixel in the color image) does not encode a 3D point. This technique is well-known in the 3D scene encoding domain in order to prevent the use of key maps. An advantage of this embodiment is to create wide areas of neighbor pixels with a same value in views of the MVD frame, so their compression rate is widely enhanced. Color images 150t and 151t of FIG. 15 are transformed into color images 160t and 161t. Depth images 150d and 151d of FIG. 15 are transformed into depth images 160d and 161d. An advantage of this techniques is that a wide part of the redundant information between views is removed from view of the MVD frame and stored, only once, in the immersive view. Metadata comprising extrinsic and intrinsic parameters of the cameras remain associated with each view of the MVD frame. In the first embodiment of the present disclosure, images 162t and 162d are encoded in a first element of syntax of the stream and images 160t, 160d, 161t and 161d and associated metadata are encoded in at least a second element of syntax of the stream.

Figure 10:
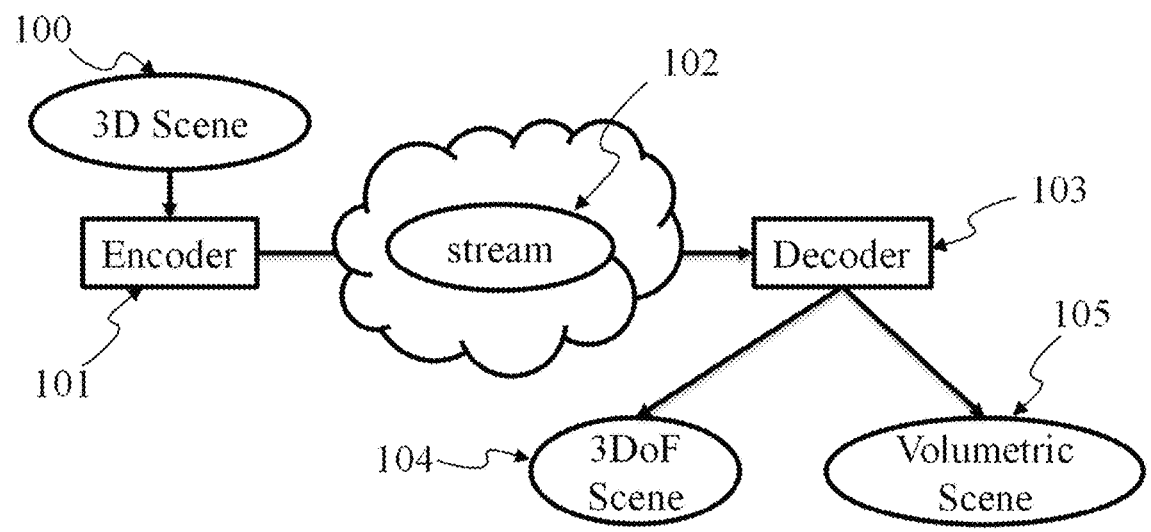
FIG. 10 illustrates an example of the encoding, transmission and decoding of a sequence of 3D scene in a format that is, at the same time, 3DoF rendering compatible and volumetric rendering compatible, according to a non-restrictive embodiment of the present principles.

FIG. 10 illustrates an example of the encoding, transmission and decoding of a sequence of 3D scene in a format that is, at the same time, 3DoF rendering compatible and volumetric rendering compatible. A three-dimension scene 100 (or a sequence of 3D scenes) is encoded in a stream 102 by an encoder 101 according to the principles of the present encoding method. Stream 102 comprises a first element of syntax carrying data representative of a 3D scene for a 3DoF rendering. In a first embodiment, the 3D scene is obtained from a MVD frame sequence. At least a second element comprises the MVD frame sequence from which points projected onto the view of the first element of syntax. In a second embodiment, the second elements of syntax carry data representative of color and depth data representative of the residual points of the 3D scene. A decoder 103 obtains stream 102 from a source. For example, the source belongs to a set comprising:

a local memory, e.g. a video memory or a RAM (or Random Access Memory), a flash memory, a ROM (or Read Only Memory), a hard disk;

a storage interface, e.g. an interface with a mass storage, a RAM, a flash memory, a ROM, an optical disc or a magnetic support;

a communication interface, e.g. a wireline interface (for example a bus interface, a wide area network interface, a local area network interface) or a wireless interface (such as a IEEE 802.11 interface or a Bluetooth® interface); and a user interface such as a Graphical User interface enabling a user to input data.

Decoder 103 decodes the first element of syntax of stream 102. In case the decoder is configured to provide a further module, for example a 3DoF renderer or a format converter, with a 3DoF scene, the decoder transmits data decoded from this first element of syntax. These data are representative of a 3D scene comprising scene points for a 3DoF rendering. In case the decoder is configured to provide a further module, for example a 3DoF renderer or a format converter, the decoder decodes data from at least one second element of syntax of the stream.

Figure 11:
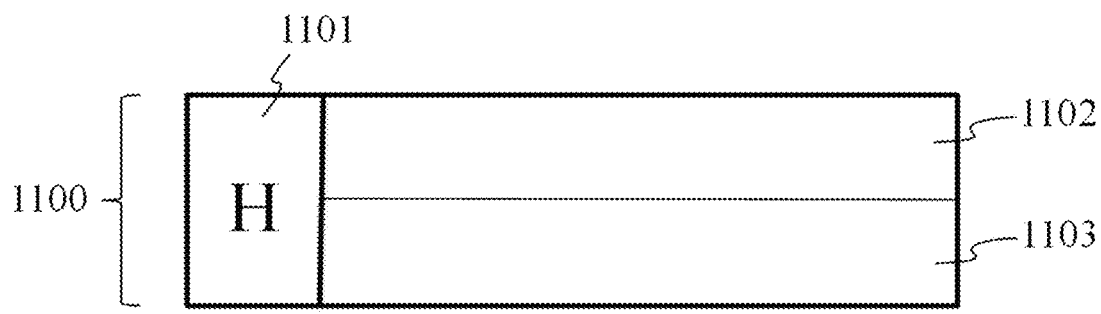
FIG. 11 shows an example of an embodiment of the syntax of a stream when the data are transmitted over a packet-based transmission protocol, according to a non-restrictive embodiment of the present principles.

FIG. 11 shows an example of an embodiment of the syntax of a stream when the data are transmitted over a packet-based transmission protocol. FIG. 11 shows an example structure 1100 of a volumetric video stream. The structure consists in a container which organizes the stream in independent elements of syntax. The structure may comprise a header part 1101 which is a set of data common to every syntax elements of the stream. For example, the header part comprises metadata about syntax elements, describing the nature and the role of each of them. The header part may also comprise the coordinates of the point of view used for the encoding the first color image for 3DoF rendering and information about the size and the resolution of pictures. The structure comprises a payload comprising a first element of syntax 1102 and at least one second element of syntax 1103. The first syntax element 1102 comprises data representative of the first color and depth images prepared for a 3DoF rendering. Images may have been compressed according to a video compression method.

In a first embodiment, the second syntax element comprises data generated from the MVD frames received from the source. Pixels of these source MVD frames used for generating the first view as illustrated in FIG. 16 are removed from the MVD frames.

In a second embodiment of the present principles, the second syntax element comprises color and depth information of residual points of the 3D scene, Residual points of the scene are projected to a second color image and to a second depth image. Residual points of the scene are the points of the scene which have not been encoded in the first color image. If a part of the residual points is not visible from the determined point of view, step 1303 may be reiterated until every residual point has been projected to a color and a depth map. In a variant, the point of view may be displaced, for example within a space of view determined for a 3DoF+ rendering at each iteration of step 1303. In another embodiment, iterated second color images and second depth images may be clustered in patches according to the principle than described in the present application. In this embodiment, color patches are packed in a color patch atlas. Depth patches are packed in a second depth patch atlas. In a variant, depth patches are packed in the first depth patch atlas which already comprises depth patches associated with the first color image. Patch data items comprise an information indicating to what color image or patch atlas is associated with a depth patch.

For illustration purpose, in the context of ISOBMFF file format standard, color map, depth map and the metadata would typically be referenced in ISOBMFF tracks in a box of type MOOV, with color map and depth map data themselves embedded in media-data box of type mdat.

Figure 12:
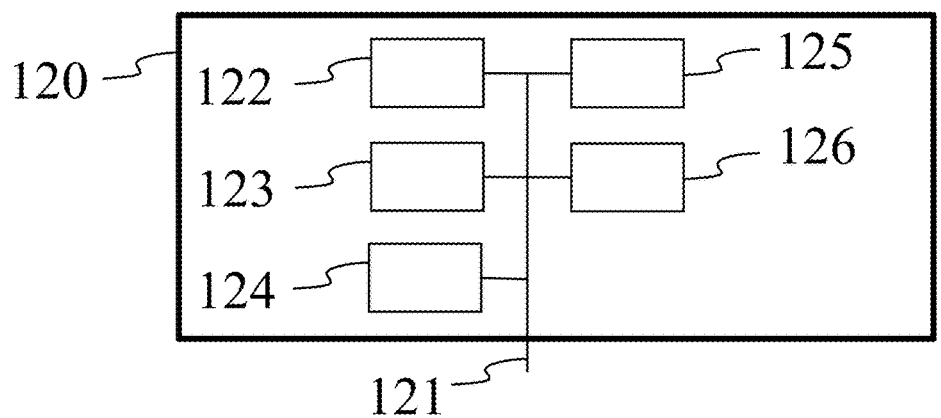
FIG. 12 shows an example architecture of a device which may be configured to implement a method described in relation with FIGS. 13 and/or 14, according to a non-restrictive embodiment of the present principles.
Figure 13:
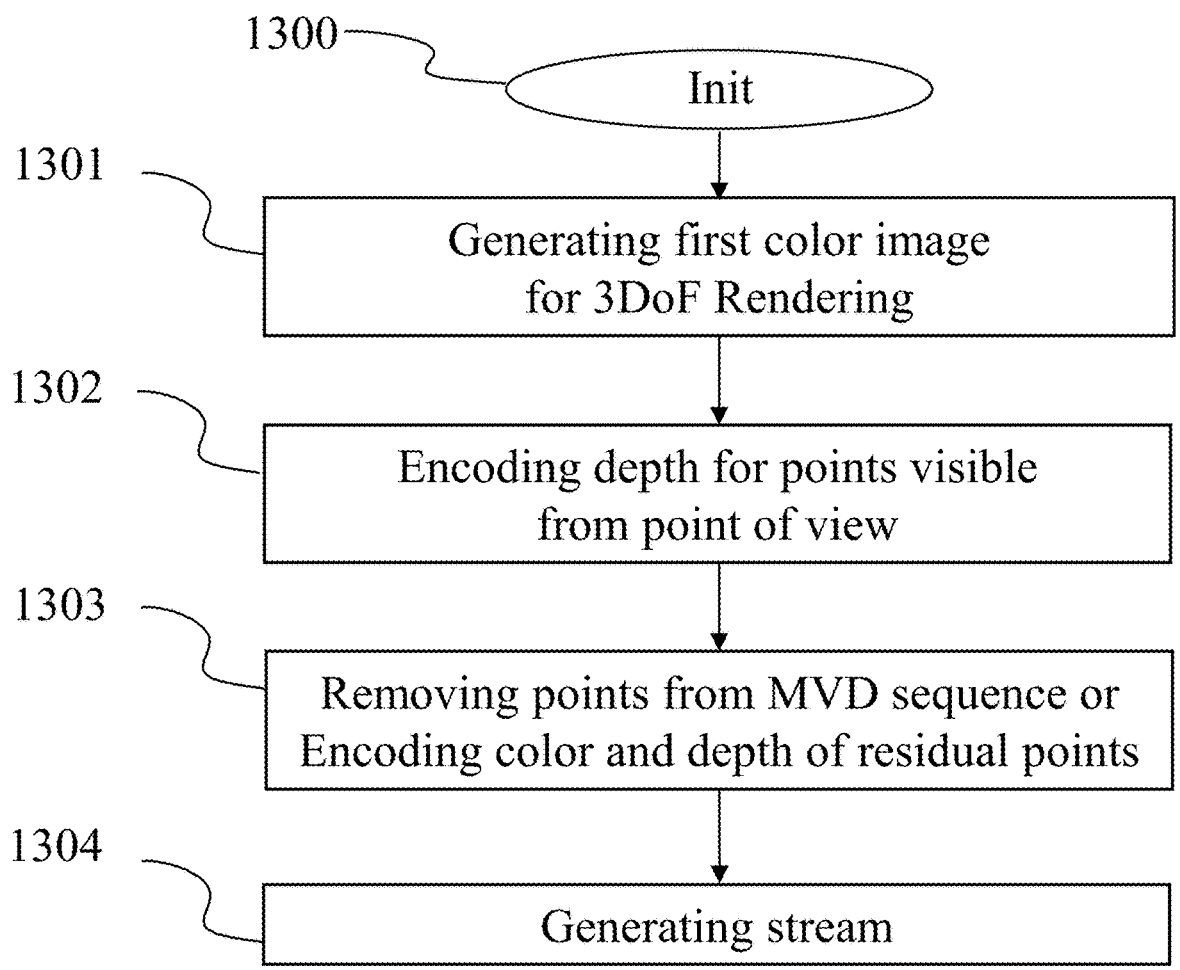
FIG. 13 illustrates a method for encoding a 3D scene in a stream, in a device (described with regard to FIG. 12) configured to be a device 101 of FIG. 10, according to a non-restrictive embodiment of the present principles.

FIG. 12 shows an example architecture of a device 120 which may be configured to implement a method described in relation with FIGS. 13 and/or 14. The device 120 may be configured to be an encoder 101 or a decoder 103 of FIG. 10.

The device 120 comprises following elements that are linked together by a data and address bus 121:
  a microprocessor 122 (or CPU), which is, for example, a DSP (or Digital Signal Processor);
  a ROM (or Read Only Memory) 123;
  a RAM (or Random Access Memory) 124;
  a storage interface 125;
  I/O interface 126 for reception of data to transmit, from an application; and
  a power supply, e.g. a battery.

In accordance with an example, the power supply is external to the device. In each of mentioned memory, the word «register» used in the specification may correspond to area of small capacity (some bits) or to very large area (e.g. a whole program or large amount of received or decoded data). The ROM 123 comprises at least a program and parameters. The ROM 123 may store algorithms and instructions to perform techniques in accordance with present principles. When switched on, the CPU 122 uploads the program in the RAM and executes the corresponding instructions.

The RAM 124 comprises, in a register, the program executed by the CPU 122 and uploaded after switch-on of the device 120, input data in a register, intermediate data in different states of the method in a register, and other variables used for the execution of the method in a register.

The implementations described herein may be implemented in, for example, a method or a process, an apparatus, a computer program product, a data stream, or a signal. Even if only discussed in the context of a single form of implementation (for example, discussed only as a method or a device), the implementation of features discussed may also be implemented in other forms (for example a program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

In accordance with an example of encoding or an encoder 101 of FIG. 10, the three-dimension scene 100 is obtained from a source, for example in the form of a MVD frame sequence. For example, the source belongs to a set comprising:
  a local memory (123 or 124), e.g. a video memory or a RAM (or Random Access Memory), a flash memory, a ROM (or Read Only Memory), a hard disk;
  a storage interface (125), e.g. an interface with a mass storage, a RAM, a flash memory, a ROM, an optical disc or a magnetic support;
  a communication interface (126), e.g. a wireline interface (for example a bus interface, a wide area network interface, a local area network interface) or a wireless interface (such as a IEEE 802.11 interface or a Bluetooth® interface); and
  a user interface such as a Graphical User Interface enabling a user to input data.

In accordance with examples of the decoding or decoder(s) 103 of FIG. 10, the stream is sent to a destination; specifically, the destination belongs to a set comprising:
  a local memory (123 or 124), e.g. a video memory or a RAM, a flash memory, a hard disk;

a storage interface (125), e.g. an interface with a mass storage, a RAM, a flash memory, a ROM, an optical disc or a magnetic support; and a communication interface (126), e.g. a wireline interface (for example a bus interface (e.g. USB (or Universal Serial Bus)), a wide area network interface, a local area network interface, a HDMI (High Definition Multimedia interface) interface) or a wireless interface (such as a IEEE 802.11 interface, WiFi® or a Bluetooth® interface).

In accordance with examples of encoding or encoder, a bitstream comprising data representative of the volumetric scene is sent to a destination. As an example, the bitstream is stored in a local or remote memory, e.g. a video memory (104) or a RAM (104), a hard disk (103). In a variant, the bitstream is sent to a storage interface (105), e.g. an interface with a mass storage, a flash memory, ROM, an optical disc or a magnetic support and/or transmitted over a communication interface (106), e.g. an interface to a point to point link, a communication bus, a point to multipoint link or a broadcast network.

In accordance with examples of decoding or decoder or renderer 103 of FIG. 10, the bitstream is obtained from a source. Exemplarily, the bitstream is read from a local memory, e.g. a video memory (124), a RAM (124), a ROM (123), a flash memory (123) or a hard disk (123). In a variant, the bitstream is received from a storage interface (125), e.g. an interface with a mass storage, a RAM, a ROM, a flash memory, an optical disc or a magnetic support and/or received from a communication interface (125), e.g. an interface to a point to point link, a bus, a point to multipoint link or a broadcast network.

Figure 14:
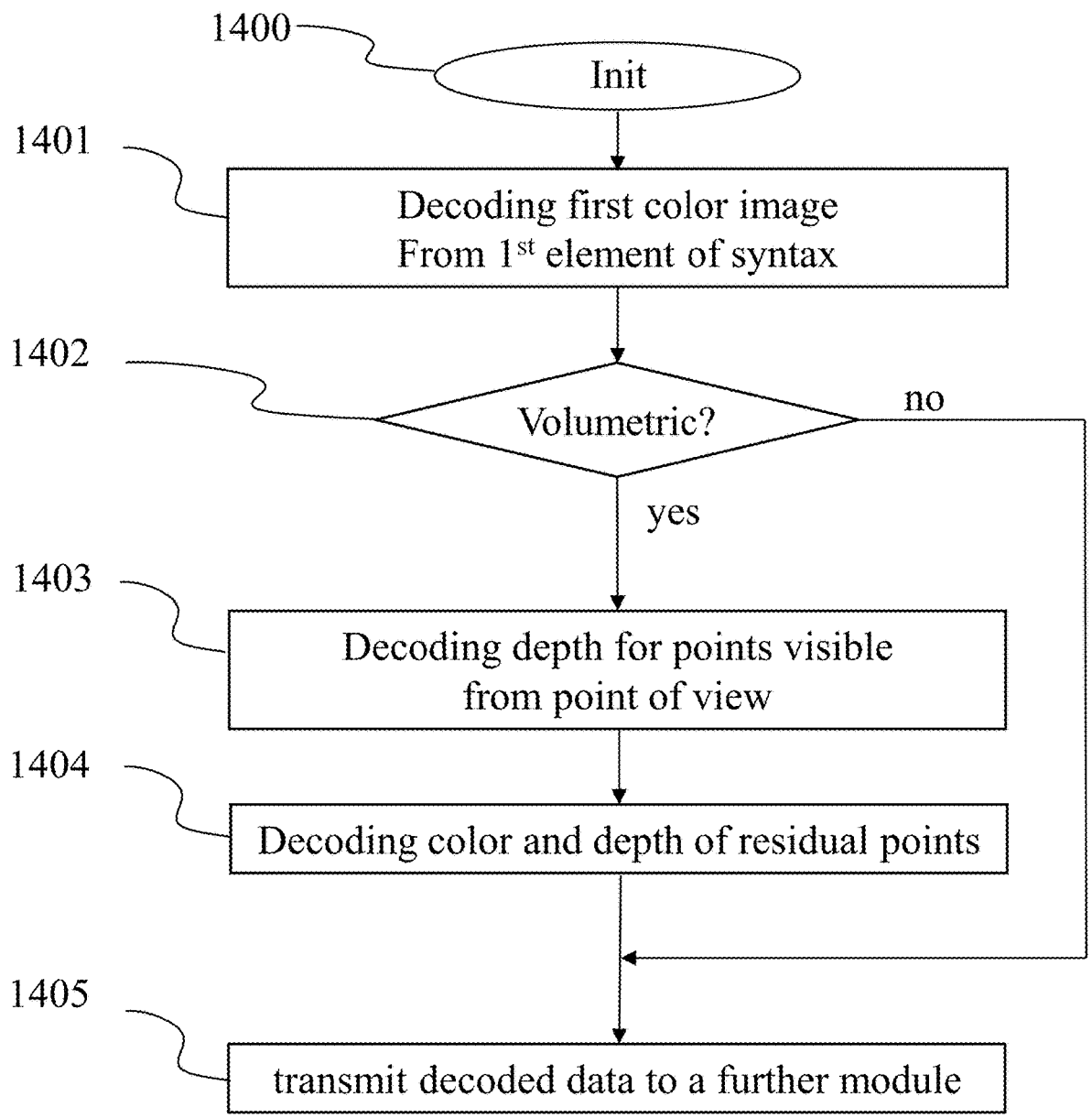
FIG. 14 illustrates a method for decoding a three-dimension scene from a stream, in a device 120 (described with regard to FIG. 12) configured to be a device 103 of FIG. 10, according to a non-restrictive embodiment of the present principles.

In accordance with examples, the device 120 is configured to implement a method described in relation with FIG. 13 or 14, and belongs to a set comprising:

a mobile device;
a communication device;
a game device;
a tablet (or tablet computer);
a laptop;
a still picture camera;
a video camera;
an encoding chip;
a server (e.g. a broadcast server, a video-on-demand server or a web server).

FIG. 13 illustrates a method for encoding a 3D scene in a stream, in a device 120 (described with regard to FIG. 12) configured to be a device 101 of FIG. 10, according to a non-restrictive embodiment of the present principles.

In a step 1300, the different parameters of the device 120 are updated. In particular, the 3D scene is obtained from a source. For example, a MVD frame is obtained and the 3D scene is determined according to the information comprised in the MVD frame. A point of view is determined in the space of the 3D scene, a projection mapping is initialized and sizes and resolutions of the projection map and images are determined.

In a step 1301, points of the 3D scene visible from the point of view are encoded in a first color image according to a projection mapping. The first color image is compatible for a 3DoF rendering.

In a step 1302, depth information regarding the points of the scene visible from the determined point of view is encoded in a first depth image. In another embodiment, this depth information is encoded in a depth patch atlas and a patch data item list is built. A patch data item comprises information to map depth patches of the depth patch atlas with a pixel area in the first color image. Patch data items of the first patch atlas comprise an information indicating that these depth patches are mapped with pixel areas of the first color image.

In a step 1303, in a first embodiment, In a step 1303, pixels associated with the 3D points of the 3D scene projected onto the first color map are removed from color and depth images of the MVD frame as illustrated in relation to FIG. 16. In a second embodiment, residual points of the scene are projected to a second color image and to a second depth image. Residual points of the scene are the points of the scene which have not been encoded in the first color image. If a part of the residual points is not visible from the determined point of view, step 1303 may be reiterated until every residual point has been projected to a color and a depth map. In a variant, the point of view may be displaced, for example within a space of view determined for a 3DoF+ rendering at each iteration of step 1303. In another embodiment, iterated second color images and second depth images may be clustered in patches according to the principle than described in the present application. In this embodiment, color patches are packed in a color patch atlas. Depth patches are packed in a second depth patch atlas. In a variant, depth patches are packed in the first depth patch atlas which already comprises depth patches associated with the first color image. Patch data items comprise an information indicating to what color image or patch atlas is associated with a depth patch.

In a step 1304, a stream carrying data representative of the 3D scene is generated according to the structure described in relation to FIG. 11. The stream comprises data of the first color image in a first element of syntax. The first color image is encoded in a dedicated element of syntax of the stream in order to be decodable independently from the other data of the stream. As the first color image is the only data required to perform a 3DoF rendering, it is an advantage of the present principles to generate a stream in which the first color image can be decoded without having to decode complementary data which are needed to perform a volumetric rendering. Data prepared at steps 1302 and 1304 are encoded in at least one second element of syntax of the stream. So, they can be decoded only if necessary, in case the decoder is configured to decode data for a volumetric rendering. In embodiments, step 1304 may be executed in parallel to steps 1301, 1302 and 1303 or steps of the method may be executed sequentially.

FIG. 14 illustrates a method for decoding a three-dimension scene from a stream, in a device 120 (described with regard to FIG. 12) configured to be a device 103 of FIG. 10, according to a non-restrictive embodiment of the present principles.

In a step 1400, the different parameters of the device 120 are updated. In particular, the stream is obtained from a source, a point of view is determined in the space of the 3D scene. In a variant, the location of the point of view is decoded from the stream. The stream comprises a first element of syntax carrying data representative of a first color image. The first color image is compatible with a 3DoF rendering and has been encoded according to a first projection mapping. The stream further comprises at least one second element of syntax carrying data representative of depth of points of the first color image and color and depth of points of the scene not visible from the point of view, for example in the form of a MVD frame.

In a step 1401, the first color image is decoded from the first element of syntax of the stream. The first color image is decompressed if it has been compressed, for example according to a standard image or video compression method.

In a step 1402, the decoder checks if it is configured to decode the 3D scene for a 3DoF rendering or for a volumetric rendering. This checking step may be implicit (i.e. not performed) and the decoding method executes step 1405 right after step 1402. In a variant, the decoder obtains a checking information from a source. The checking information may be decoded from the stream or read in a memory or received from a remote device via a communication interface of the device 120. In case the decoder is configured to decode the 3D scene for a 3DoF rendering, the method executes step 1405. In case the decoder is configured to decode the 3D scene for a volumetric rendering, the methods execute steps 1403.

In step 1403, data representative of the depth of points of the scene encoded in the first color image are decoded from a second element of syntax of the stream. These data may be encoded in a first depth image. In another embodiment, these data may be encoded in a first depth patch atlas associated with a patch data item list. A patch data of this list comprises information to map a depth patch of the first depth patch atlas with a pixel area of the first color image. In case the first depth patch atlas is used to encode depth patches for residual points of the 3D scene, the patch data items of this first list comprise an information indicating that the associated patch refers to the first color image.

In a step 1404 executed after or in parallel to step 1403. In a first embodiment, the MVD frame is decoded and information comprised in the depth image of the views is used in correlation with the metadata associated with the views to de-project pixels of the color image of the views in the 3D scene. In a second embodiment, color and depth data representative of points of the 3D scene, called residual points, are decoded from at least one second element of syntax of the stream. Residual points correspond to points of the scene not visible from the determined point of view but visible from a different point of view of the space of view. These data are encoded in at least a second color image and a second depth image. In another embodiment, these data are encoded in at least a color patch atlas and a second depth patch atlas. In a variant, the second depth patch atlas is a part of the first depth patch atlas. A patch data item list is associated with these data. A patch data item comprises at least information to associate a depth patch with a color image or to a color patch. Data decoded from the stream at steps 1402, 1403 and 1404 represent the three-dimension scene as required for a volumetric rendering.

In a step 1405, the decoded scene is transmitted to a further module, for example a 3DoF renderer or a volumetric renderer or another type of module, for instance, a format converter. The reconstruction of the scene from the pixels in the first and second color image and their corresponding value in the depth patch atlas is determined according to patch data item that map depth and color data in order to allow a de-projection of the points of the 3D scene according to the projection mapping used for encoding.

Naturally, the present disclosure is not limited to the embodiments previously described.

In particular, the present disclosure is not limited to methods and devices for encoding/decoding a stream carrying data representative of a three-dimension scene (or a sequence of three-dimension scenes) but also extends to methods of rendering a 3D scene in a 3 degrees of freedom manner or in a volumetric manner (i.e. 3DoF+ or 6DoF) to any devices implementing these methods and notably any devices comprising at least one CPU and/or at least one GPU.

The present disclosure also relates to a method (and a device configured) for displaying images rendered from the data stream comprising the information representative of the three-dimension scene.

The present disclosure also relates to a method (and a device configured) for transmitting and/or receiving the stream encoded according to the present principles.

The implementations described herein may be implemented in, for example, a method or a process, an apparatus, a computer program product, a data stream, or a signal. Even if only discussed in the context of a single form of implementation (for example, discussed only as a method or a device), the implementation of features discussed may also be implemented in other forms (for example a program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, Smartphones, tablets, computers, mobile phones, portable/personal digital assistants ("PDAs"), and other devices that facilitate communication of information between end-users.

Implementations of the various processes and features described herein may be embodied in a variety of different equipment or applications, particularly, for example, equipment or applications associated with data encoding, data decoding, view generation, texture processing, and other processing of images and related texture information and/or depth information. Examples of such equipment include an encoder, a decoder, a post-processor processing output from a decoder, a pre-processor providing input to an encoder, a video coder, a video decoder, a video codec, a web server, a set-top box, a laptop, a personal computer, a cell phone, a PDA, and other communication devices. As should be clear, the equipment may be mobile and even installed in a mobile vehicle.

Additionally, the methods may be implemented by instructions being performed by a processor, and such instructions (and/or data values produced by an implementation) may be stored on a processor-readable medium such as, for example, an integrated circuit, a software carrier or other storage device such as, for example, a hard disk, a compact diskette ("CD"), an optical disc (such as, for example, a DVD, often referred to as a digital versatile disc or a digital video disc), a random access memory ("RAM"), or a read-only memory ("ROM"). The instructions may form an application program tangibly embodied on a processor-readable medium. Instructions may be, for example, in hardware, firmware, software, or a combination. Instructions may be found in, for example, an operating system, a separate application, or a combination of the two. A processor may be characterized, therefore, as, for example, both a device configured to carry out a process and a device that includes a processor-readable medium (such as a storage device) having instructions for carrying out a process. Further, a processor-readable medium may store, in addition to or in lieu of instructions, data values produced by an implementation.

As will be evident to one of skill in the art, implementations may produce a variety of signals formatted to carry information that may be, for example, stored or transmitted.

The information may include, for example, instructions for performing a method, or data produced by one of the described implementations. For example, a signal may be formatted to carry as data the rules for writing or reading the syntax of a described embodiment, or to carry as data the actual syntax values written by a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this application,

The invention claimed is:

1. A method of generating a stream representative of a 3D scene, the method comprising:
   generating first color data by projecting first points of the 3D scene visible for 360 degrees from a first point of view onto a first color map, said first color data being a color image adapted to a rendering enabling three degrees of freedom of rotation around said first point of view;
   generating first depth data by projecting said first points onto a first depth map, said first depth data being encoded as patch pictures packed in a depth atlas associated with metadata comprising information mapping a depth patch picture with a pixel area of said color image, wherein a patch picture comprises the points projected onto a projection map which define an area of adjacent pixels in the projection map and which are depth consistent, and wherein an atlas is an image gathering patch pictures;
   generating second color data and second depth data representative of second points of the 3D scene visible for 360 degrees from a plurality of second points of view within a space of view around said first point of view, wherein said second points are visible from at least one of the plurality of second points of view and invisible from said first point of view; and
   encoding, in said stream, a header, a first element of syntax encoding said first color data, and a second element of syntax encoding said first depth data, said second color data, said second depth data, and said metadata.

2. The method of claim 1, wherein the 3D scene is obtained in the form of a Multiview plus depth (MVD) frame and wherein generating second color data and second depth data is performed by removing pixels of views of the MVD frame associated with points of the 3D scene visible from said first point of view.

3. The method of claim 1, wherein generating second color data and second depth data is performed by projecting residual points of the 3D scene onto a second color map and onto a second depth map, said residual points being points of the 3D scene visible from within the space of view, and invisible from said first point of view.

4. The method of claim 3, wherein said second color data are encoded as patch pictures packed in a color atlas and wherein said second depth data are encoded as patch pictures in a second depth atlas and associated with metadata comprising information mapping a depth patch picture with a color patch of said color atlas.

5. A device for encoding data representative of a 3D scene into a stream, the device comprising a processor configured to:
   generate first color data by projecting first points of the 3D scene visible for 360 degrees from a first point of view onto a first color map according to a first projection mapping, said first color data being a color image adapted to a rendering enabling three degrees of freedom of rotation around said first point of view;
   generate first depth data by projecting said first points onto a first depth map, said first depth data being encoded as patch pictures packed in a depth atlas associated with metadata comprising information mapping a depth patch picture with a pixel area of said color image, wherein a patch picture comprises the points projected onto a projection map which define an area of adjacent pixels in the projection map and which are depth consistent, and wherein an atlas is an image gathering patch pictures;
   generate second color data and second depth data representative of second points of the 3D scene visible for 360 degrees from a plurality of second points of view within a space of view around said first point of view, wherein said second points are visible from at least one of the plurality of second points of view and invisible from said first point of view; and
   encode, in said stream, a header, a first element of syntax encoding said first color data, and a second element of syntax encoding said first depth data, said second color data, said second depth data, and said metadata.

6. The device of claim 5, wherein the 3D scene is obtained in the form of a Multiview plus depth (MVD) frame and wherein generating second color data and second depth data is performed by removing pixels of views of the MVD frame associated with points of the 3D scene visible from said first point of view.

7. The device of claim 5, wherein generating second color data and second depth data is performed by projecting residual points of the 3D scene onto a second color map and onto a second depth map, said residual points being points of the 3D scene visible from the space of view, and invisible from said first point of view.

8. The device of claim 7, wherein said second color data are encoded as patch pictures packed in a color atlas and wherein said second depth data are encoded as patch pictures in a second depth atlas and associated with metadata comprising information mapping a depth patch picture with a color patch of said color atlas.

9. A method of decoding a 3D scene implemented in a rendering device configured for a volumetric rendering, the method comprising:
   obtaining a stream comprising a header, a first element of syntax, and a second element of syntax;
   decoding from the first element of syntax, first color data being a color image encoded by projecting first points of the 3D scene visible for 360 degrees from a first point of view, said color image adapted to a rendering enabling three degrees of freedom of rotation around said first point of view; and decoding from the second element of syntax, first depth data encoded as patch pictures packed in a first depth atlas obtained by projecting said first points, second color data, second depth data, and metadata comprising information mapping a depth patch picture with a pixel area of said color image, wherein the second depth data are representative of second points of the 3D scene visible for 360 degrees from a plurality of second points of view within a space of view around said first point of view, and wherein said second points are visible from at least one of the plurality of second points of view and invisible from said first point of view;

wherein a patch picture comprises the points projected onto a projection map which define an area of adjacent pixels in the projection map and which are depth consistent, and wherein an atlas is an image gathering patch pictures.

10. The method of claim 9, further comprising:
decoding first depth data according to said metadata; and
decoding second color data and second depth data.

11. The method of claim 10, wherein said second color data and second depth data are encoded as a MVD frame.

12. The method of claim 10, wherein said second color data and second depth data are a projection of residual points of the 3D scene from said first point of view, said residual points being points of the 3D scene visible from said first point of view.

13. The method of claim 12, wherein said second color data are encoded as patch pictures packed in a color atlas and wherein said second depth data are encoded as patch pictures in a second depth atlas associated with metadata comprising information mapping a depth patch picture to a color patch of said color atlas.

14. A rendering device configured for a volumetric rendering comprising a processor configured to:
obtain a stream comprising a header, a first element of syntax, and a second element of syntax;
decode from the first element of syntax, first color data being a color image encoded by projecting first points of the 3D scene visible for 360 degrees from a first point of view, said color image adapted to a rendering enabling three degrees of freedom of rotation around said first point of view; and
decode from the second element of syntax, first depth data encoded as patch pictures packed in a first depth atlas obtained by projecting said first points, second color data, second depth data, and metadata comprising information mapping a depth patch picture with a pixel area of said color image, wherein the second depth data are representative of second points of the 3D scene visible for 360 degrees from a plurality of second points of view within a space of view around said first point of view, and wherein said second points are visible from at least one of the second points of view and invisible from said first point of view;

wherein a patch picture comprises the points projected onto a projection map which define an area of adjacent pixels in the projection map and which are depth consistent, and wherein an atlas is an image gathering patch pictures.

15. The device of claim 14, wherein the processor is further configured to:
decode first depth data according to said metadata; and
decode second color data and second depth data.

16. A non-transitory computer readable medium comprising computer-executable instructions to enable a processor to perform:
generating first color data by projecting first points of the 3D scene visible for 360 degrees from a first point of view onto a first color map, said first color data being a color image adapted to a rendering enabling three degrees of freedom of rotation around said first point of view;
generating first depth data by projecting said first points onto a first depth map, said first depth data being encoded as patch pictures packed in a depth atlas associated with metadata comprising information mapping a depth patch picture with a pixel area of said color image, wherein a patch picture comprises the points projected onto a projection map which define an area of adjacent pixels in the projection map and which are depth consistent, and wherein an atlas is an image gathering patch pictures;
generating second color data and second depth data representative of second points of the 3D scene visible for 360 degrees from a plurality of second points of view within a space of view around said first point of view, wherein said second points are visible from at least one of the plurality of second points of view and invisible from said first point of view; and
encoding, in said stream, a header, a first element of syntax encoding said first color data, and a second element of syntax encoding said first depth data, said second color data, said second depth data, and said metadata.

17. A non-transitory computer readable medium comprising computer-executable instructions to enable a rendering device configured for a volumetric rendering to perform:
obtaining a stream comprising a header, a first element of syntax, and a second element of syntax;
decoding from the first element of syntax, first color data being a color image encoded by projecting first points of the 3D scene visible for 360 degrees from a first point of view, said color image adapted to a rendering enabling three degrees of freedom of rotation around said first point of view; and
decoding from the second element of syntax, first depth data encoded as patch pictures packed in a first depth atlas obtained by projecting said first points, second color data, second depth data, and metadata comprising information mapping a depth patch picture with a pixel area of said color image, wherein the second depth data are representative of second points of the 3D scene visible for 360 degrees from a plurality of second points of view within a space of view around said first point of view, and wherein said second points are visible from at least one of the plurality of second points of view and invisible from said first point of view;

wherein a patch picture comprises the points projected onto a projection map which define an area of adjacent pixels in the projection map and which are depth consistent, and wherein an atlas is an image gathering patch pictures.

* * * * *